Patented Aug. 20, 1940

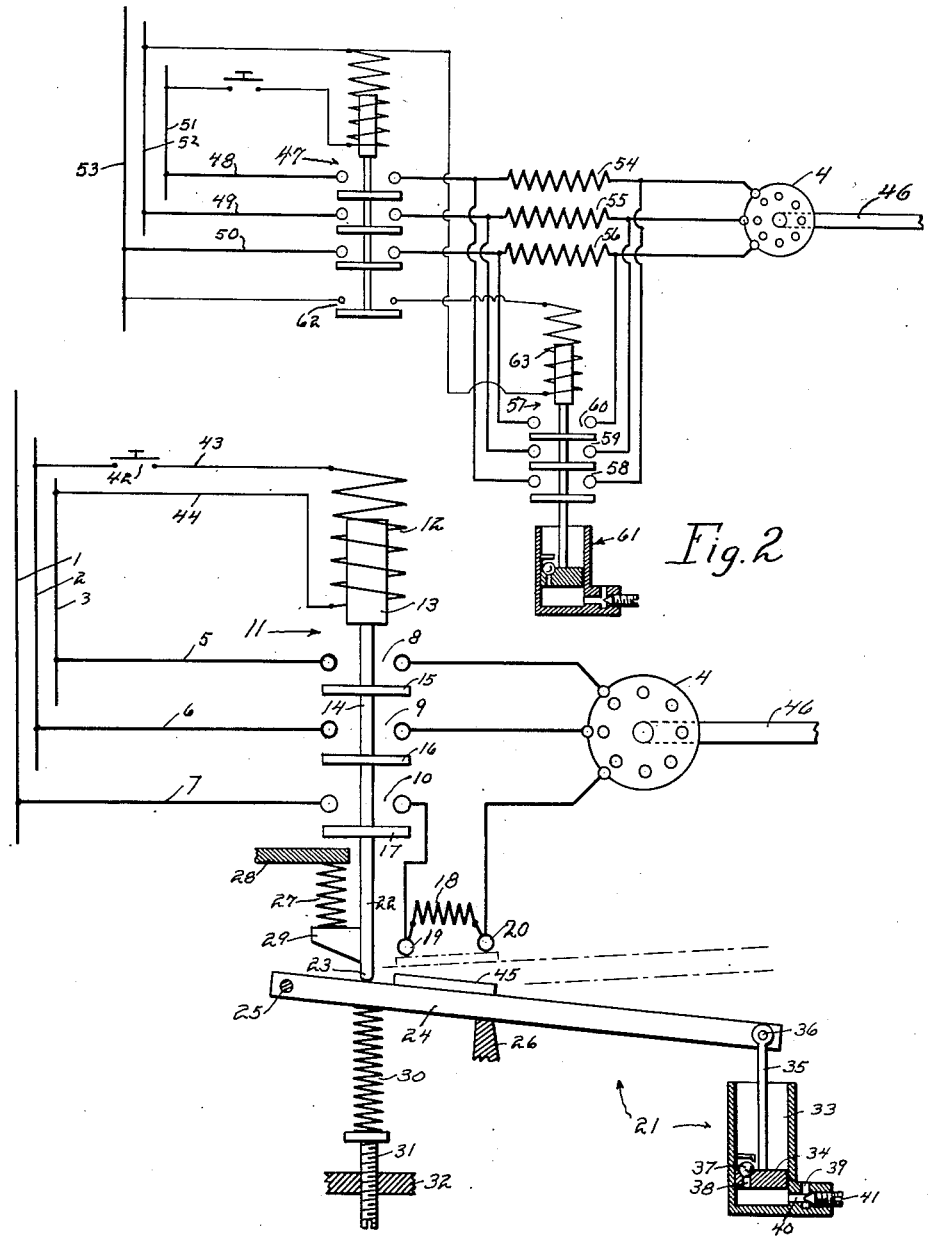

2,211,985

UNITED STATES PATENT OFFICE 2,211,985

ACROSS-THE-LINE MOTOR STARTER WITH CUSHIONED START

Gerhard W. Peters, Cuyahoga Falls, Ohio, assignor to The Clark Controller Company, Cleveland, Ohio, a corporation of Ohio Application February 2, 1939, Serial No. 254,245

10 Claims. (Cl. 172—289)

This invention relates to automatic starters for electric motors, and particularly to alternating current induction motors.

The invention has special application to three-phase alternating current motors of the squirrel cage induction type, and will be described herein as applied to that use, although as will appear hereinafter, it may be applied to multi-phase motors generally.

It is common practice to start or accelerate an induction motor, for example a motor of the three-phase, squirrel cage induction type, by means of resistance in the three primary circuits of the motor. The known practice is to utilize three resistance units, one in each of the three primary lines leading to the motor primary. A three-pole contactor is first closed to connect the motor primary to the three current supply mains through the three resistance units. After the motor, thus started from rest, comes up to a predetermined speed, a delayed operation three-pole contactor closes and short-circuits the three resistance units, thereby connecting the primary circuits of the motor directly to the supply mains.

There are many instances in which the load driven by the motor is light and the motor itself is therefore of low horse power, and can be started and accelerated by connecting its primary circuit directly to the supply mains by a starter which is merely a three-pole contactor, without utilizing resistances. Such starters are known as across-the-line starters and bring the motor to full speed very quickly and abruptly. The load, which may be a machine or apparatus, is frequently of such character, however, that such sudden abrupt starting may be injurious to it. An example of such a driven machine is one comprising power-transmission gearing. A starter of the across-the-line type may be sufficient for the needs of the motor, but the lost motion in the gearing suddenly taken up by the abrupt starting of the motor produces shock on the gear teeth and on the machine driven thereby.

On the other hand, if a primary resistance starter is provided to give a more gradual acceleration to the motor, the starter is unduly expensive for the low horse power of the installation, comprising as it does, not only a three-pole magnetically operated contactor and three resistance units, but also a three-pole magnetically operated delayed operation contactor for short-circuiting the resistances.

The problem is thus presented of providing a relatively inexpensive starter of the across-the-line type which will avoid a sudden abrupt motor acceleration, or in other words, which will cushion or soften the initial torque strain transmitted from the motor to the load, and to provide such a starter is the primary object of the present invention.

Other objects are:

To provide generally an improved motor starter which will be cheap to construct and assemble, but efficient in operation;

To provide generally an improved motor starter particularly applicable to starting squirrel cage induction motors with a cushioned or take-up type of starting;

To provide a motor starter of the across-the-line type or magnetic contactor type having auxiliary means for effecting a cushioned or take-up starting of the motor.

Other objects will be apparent to those skilled in the art to which my invention appertains.

My invention is fully disclosed in the following description taken in connection with the accompanying drawing, in which;

Fig. 1 illustrates diagrammatically an embodiment of my invention applied to a three-phase squirrel cage induction motor;

Fig. 2 illustrates diagrammatically the conventional known starter for the motor of Fig. 1, over which my invention is an improvement.

Referring to the drawing, I have shown at 1, 2, and 3, the three alternating current mains of a three-phase alternating current supply system. A squirrel cage induction motor 4, has conductors 5, 6, and 7 connected to its primary from the three mains 1, 2, and 3. The conductors 5, 6 and 7 are normally open at the contacts 8, 9 and 10 of a three-pole magnetic contactor illustrated generally at 11, and comprising an energizing winding 12, a magnetic plunger 13, a rod 14, on which are mounted three contact-bridging members 15, 16 and 17. By this arrangement when the winding 12 is energized, the plunger 13 and rod 14 are moved upwardly, and the bridging members 15, 16 and 17 bridge the contacts 8, 9 and 10 and close the three-phase circuit to the primary of the motor 4, from the mains 1, 2 and 3, through the conductors 5, 6 and 7.

While the magnetic contactor 11 is illustrated diagrammatically, it is to be understood that any suitable or known construction of electromagnetic contactor of the three-pole type may be employed for this purpose.

In the line of the conductor 7 is a resistance unit 18, the terminals of which are connected to contacts 19 and 20, arranged to be bridged in a manner to be described.

Below the contactor 11 is a delayed operation device, illustrated generally at 21. Although this device is illustrated diagrammatically in the drawing, in operating co-ordination with the contactor 11, it is to be understood that the elements of the contactor 11 and the device 21, now to be described, may be embodied in various forms in an actual apparatus.

In the diagrammatic showing, the rod 14 of the contactor 11 extends downwardly as at 22 and the lower end 23 thereof rests upon the upper side of a bar 24 pivotally mounted at 25, and the downward or clockwise movement of which is stopped by resting upon a stationary stop 26. The rod 14 and the bar 24 are normally held downwardly and supported on the stop 26 by a spring 27 abutting at its upper end upon a stationary abutment 28 and abutting at its lower end upon a bracket 29, extending laterally from the rod portion 22.

A spring 30 is provided abutting at its upper end upon the underside of the bar 24 and at its lower end upon an adjustable screw 31, threaded into a stationary support 32. With the parts in their normal position, the spring 27 is capable of overpowering the spring 30 and of holding the bar 24 against the stop 26.

At the outer end of the bar 24 is an escapement device in the form of a cylinder 33 and a piston 34 therein. The piston has a piston rod 35 connected thereto, the upper end of which projects out of the cylinder 33 and is pivotally connected as at 36 to the end of the bar 24. A ball check valve 37 controlling a duct 38 extending through the piston, permits the piston 34 to move downwardly freely, the check valve closing in a well known manner to cause the piston, when moved upwardly, to create a partial vacuum in the cylinder 33, under the piston. The rate of movement of the piston 34 upwardly is controlled by the admission of atmospheric air through ducts 39 and 40 under the control of a needle valve 41, controlling the effective area of the ducts 39—40.

In the operation of the diagrammatically illustrated apparatus above described, to start the motor 4, an operator closes an operator's contactor 42, whereupon current flows from the main 2 by a wire 43 and through the winding 12 and back to the main 3 by a wire 44, thereby energizing the winding 12. The plunger 13 is raised, raising the rod 14 and bridging the contacts 8, 9 and 10, and three-phase current flows to the motor 4, the current in the conductor 7 being reduced by the resistance unit 18.

When the rod 14 is raised, compressing the spring 27, the force of the spring 27 is removed from the bar 24 and the spring 30, now being free to act, rocks the bar 24 counter-clockwise around its pivot support 25, raising the piston 34 in the cylinder 33.

The movement of the piston 34 being controlled by the needle valve 41 causes the bar 24 to move up at a controlled rate of movement whereby a time interval is caused to elapse during the movement of the bar 24. At the end of this time interval which, as will now be clear, is adjustable by the needle valve 41 and the tension of the spring 30 which, in turn, is adjustable by the screw 31, a bridging bar 45 carried by the bar 24, moves into engagement with the contacts 19 and 20, bridging the resistance 18.

When the operator's contactor 42 is released de-energizing the winding 12, the rod 14 moves downwardly under the impulsion of the spring 27 and, overcoming the spring 30, moves the bar 24 downwardly against the stop 26, restoring the piston 34 downwardly freely by the action of the check valve 37.

When, as above described, the motor 4 is connected to the lines 1—2—3, with resistance 18 in one phase thereof, the torque developed in the motor 4 is small due to the unbalancing of the three-phase energization of its primary. The motor 4 therefore starts with small developed torque, and any machine or apparatus connected to the shaft 46 of the motor is therefore started slowly and gently. If the machine comprises transmission gears, the lost motion in the gears is first taken up gently and without shock, before the torque is applied to driving the machine. Then, after a time interval, the resistance 18 is cut out and the full torque of the motor is developed, bringing it up to full speed. Such a starting of a load by the motor 4 may be called a cushioned start.

In another aspect of my invention, the apparatus illustrated and above described may be considered merely as first preparing the motor 4 for an actual start. That is to say, if the load to be driven comprises, for example transmission gearing, the aforesaid cushioned start may be merely enough to cause the motor 4 to pick up the lost motion in the gearing. The actual load may be too great for the motor to start it. After the lost motion is taken up, the motor 4 may, in some cases, stall, although exerting enough torque to maintain the lost motion in taken-up condition. Then after the resistance 18 is short-circuited the motor will receive full balanced power from the line and will exert the full torque in the usual manner.

For this reason, the value of the resistance unit 18 is not critical, that is to say, it may be of more or less resistance within a considerable range and a stock resistance unit therefore is sufficient, and it is not necessary to calculate a resistance value for this unit to adapt the starter as a whole to any particular installation.

Furthermore, the resistance value of the resistance unit and the time interval introduced by the delayed operation device delaying the movement of the bar 24, do not have to be accurately predetermined in correspondence with the starting characteristics of the machinery driven by the motor 4, it being sufficient if the time interval is enough to enable the reduced torque of the motor 4 to "wind up," so to speak, the apparatus preparatory to an actual acceleration thereof.

The apparatus as a whole, as illustrated, comprises a single magnetic contactor 11, and a mechanical device under the contactor or in any other suitable position released by the operation of the contactor, and therefore, for the reasons above given in connection with the uncritical value of the resistance unit 18, a very simple and cheap controller or starter is provided.

To illustrate more completely the improved compactness, simplicity and cheapness of the embodiment of my invention above described, I have shown in Fig. 2, diagrammatically the known and conventional type of primary resistance starter for a squirrel cage induction motor.

This conventional starter comprises a line contactor 47 for closing the three lines 48, 49 and 50 from the supply mains 51, 52 and 53 to the motor 4 through three primary circuit resistances, 54, 55, and 56 and comprises a complete additional electro-magnetic contactor 57, which, when it operates, closes contacts 58, 59 and 60, short-circuiting respectively the resistances 54, 55 and 56, the magnetic contactor 57 being furthermore a delayed operation contactor having a delay device 61 associated therewith to retard its closing movement, and the magnetic contactor 47 having an additional contact 62 thereon through which, when the contactor operates, the winding 63 of the contactor 57 is energized.

The resistances 54, 55 and 56 which, in this instance, are true starting resistances, must be calculated and predetermined to give to the motor 4 a starting torque sufficient to start the motor and the load connected to its shaft 64. If the resistances 54, 55, 56 are too small in ohmic value the machinery driven by the shaft 64 will be subject to shock as above described and the resistance value must therefore be carefully predetermined.

The apparatus of Fig. 2, involving as it does, two complete magnetic contactors, is more expensive by far than the apparatus involving but one magnetic contactor, as illustrated in the embodiment of my invention in Fig. 1.

The contactor 47, of Fig. 2, may be comparable in cost with the contactor 11, in the embodiment of my invention illustrated in Fig. 1, but the contactor 57, of Fig. 2, is far more expensive than the simple mechanical arrangement under the contactor 11, of Fig. 1, and these parts taken together with the uncritical resistance unit of Fig. 1, compared with the three resistance units, 54, 55, 56 of critical value of Fig. 2, make the starter of Fig. 1, less than one-half as expensive to manufacture as the starter of Fig. 2, for a motor of given horse-power, and for the intended purposes the starter of Fig. 1 functions fully as satisfactorily as the starter of Fig. 2.

My invention is not limited to the details of construction of the mechanism of Fig. 1, illustrated and described; many changes and modifications may be made in the mechanism shown and described while embodying the functions thereof and without departing from the spirit of my invention or sacrificing its advantages, and my invention contemplates all such changes and modifications as are embraced within the scope of the appended claims.

I claim:

1. In a cushioned starter for a multi-phase induction motor, a multi-phase energizing primary circuit for the motor, a resistance unit in a phase of the motor circuit, a normally restored magnetic contactor operable to connect the several phase circuits to the supply mains of a multi-phase alternating current supply system, energy storage means, a movable member movable by stored energy in the energy storage means, means to release energy thereof to move the movable member responsive to operation of the contactor, a delayed operation device retarding movement of the movable member, contact means for short circuiting the resistance unit operated by the movable member after a time interval of movement determined by the delayed operation device, and means to effect storing of energy in the energy storage means responsive to restoring of the contactor.

2. In a cushioned starter for a multi-phase induction motor, a multi-phase energizing primary circuit for the motor, a resistance unit in a phase of the motor circuit, a normally restored magnetic contactor operable to connect the several phase circuits to the supply mains of a multi-phase alternating current supply system, contactor spring means tending to restore the contactor to normal condition, a mechanism comprising a movable member and energy storage means tending to move it, means for transmitting energy of the contactor spring means to the movable member to restore it and to store energy in the energy storage means upon restoring of the contactor and to release energy of the energy storage means to effect movement of the movable member upon operation of the contactor, a delayed operation device retarding movement of the movable member, and contact means operable by the movable member to short circuit the resistance unit at the end of a time interval determined by the delayed operation device.

3. In a cushioned starter for a multi-phase induction motor, a multi-phase energizing primary circuit for the motor, a resistance unit in a phase of the motor circuit, a normally restored magnetic contactor operable to connect the several phase circuits to the supply mains of a multi-phase alternating current supply system, a mechanism comprising a movable element, a first spring means for moving the movable element, a second spring means for restoring the movable element against the tension of the first spring means, means responsive to operation of the contactor to render the second spring means ineffective to hold the movable member restored and to permit the first spring means to move it, a delayed operation device for retarding movement of the movable element, contact means operable by the movable element at the end of a time interval determined by the delayed operation device to short circuit the resistance unit.

4. In a cushioned starter for a multi-phase induction motor, a multi-phase energizing primary circuit for the motor, a resistance unit in a phase of the motor circuit, a normally restored contactor operable to connect the several phase circuits to the supply mains of a multi-phase alternating current supply system, energy storage means arranged to have energy stored therein by the contactor upon moving to restored condition and to be released therefrom upon operation of the contactor, a movable element moved by released energy of the storage means, contact means operated by the movable element at the end of a predetermined movement to short-circuit the resistance unit and means to retard movement of the movable element.

5. A cushioned starter, for a multi-phase induction motor, comprising a multi-phase electric power circuit for energizing the motor and having a resistance unit in one leg of the circuit, a magnetically operable contactor for closing the multi-phase circuit, and mechanism actuated by operation of the contactor comprising delayed operation means for subsequently short-circuiting the resistance unit.

6. In a cushioned starter for a multi-phase induction motor, a resistance unit in a circuit of the motor, a normally restored magnetic contactor operable to connect the motor to the supply mains of a multi-phase alternating current supply system, contactor spring means tending to restore the contactor to normal condition, a mechanism comprising a movable member and energy storage means tending to move it, means for transmitting energy of the contactor spring means to the movable member to restore it and to store energy in the energy storage means upon restoring of the contactor and to release energy therefrom to effect movement of the movable member thereby upon operation of the contactor, a delayed operation device retarding movement of the movable member, and contact means operable by the movable member to short-circuit the resistance unit at the end of a time interval determined by the delayed operation device.

7. In a cushioned starter for a multi-phase induction motor, a resistance unit in a circuit of the motor, a normally restored magnetic contactor operable to connect the motor to the supply mains of a multi-phase alternating current supply system, a mechanism comprising a movable element, a first spring means for moving the movable element, a second spring means for restoring the movable element against the tension of the first spring means, means responsive to operation of the contactor to render the second spring means ineffective to hold the movable member restored and to permit the first spring means to move it, a delayed operation device for retarding movement of the movable element, contact means operable by the movable element at the end of a time interval determined by the delayed operation device to short circuit the resistance unit.

8. In a cushioned starter for a multi-phase induction motor, a resistance unit in a circuit of the motor, a magnetically operable contactor for connecting the motor to a multi-phase circuit, and mechanism actuated by operation of the contactor comprising delayed operation means for subsequently short-circuiting the resistance unit.

9. In a cushioned starter for a multi-phase induction motor, a resistance unit in a circuit of the motor, a normally restored contactor operable to connect the motor to the supply mains of a multi-phase alternating current supply system, energy storage means arranged to have energy stored therein by the contactor upon removing to restored condition and to be released therefrom upon operation of the contactor, a movable element moved by released energy of the storage means, contact means operated by the movable element at the end of a predetermined movement to short circuit the resistance unit, and means to retard movement of the movable element.

10. In a cushioned starter for a multi-phase induction motor, a resistance unit in a circuit of the motor, a normally restored contactor operable to connect the motor to the supply mains of a multi-phase alternating current supply system, energy storage means, a movable member movable by stored energy therein, means to release energy therefrom to move the movable member responsive to operation of the contactor, a delayed operation device retarding movement of the movable member, contact means for short-circuiting the resistance unit operated by the movable member after a time interval of movement determined by the delayed operation device, and means to effect storing of energy in the energy storage means responsive to restoring of the contactor.

GERHARD W. PETERS.